US008823965B2

(12) United States Patent
Ushikubo

(10) Patent No.: US 8,823,965 B2
(45) Date of Patent: Sep. 2, 2014

(54) PRINTER DRIVER, INFORMATION PROCESSOR, AND IMAGE FORMATION APPARATUS WITH COMPATIBILITY SECUREMENT FUNCTION

(71) Applicant: Oki Data Corporation, Tokyo (JP)

(72) Inventor: Yuichi Ushikubo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 13/858,133

(22) Filed: Apr. 8, 2013

(65) Prior Publication Data

US 2013/0271781 A1  Oct. 17, 2013

(30) Foreign Application Priority Data

Apr. 12, 2012  (JP) ................................. 2012-090824

(51) Int. Cl.
*G06F 3/12* (2006.01)
(52) U.S. Cl.
CPC ............ *G06F 3/1297* (2013.01); *G06F 3/1285* (2013.01); *G06F 3/1214* (2013.01); *G06F 3/1246* (2013.01)
USPC ........................................ 358/1.13; 358/1.15
(58) Field of Classification Search
CPC ....................................................... G06F 3/12

USPC ................................................ 358/1.13, 1.15
See application file for complete search history.

(56) References Cited

U.S. PATENT DOCUMENTS

| 6,867,881 | B1* | 3/2005 | Umezato ........................ 358/1.2 |
| 2009/0219566 | A1* | 9/2009 | Tanaka et al. ................ 358/1.15 |
| 2009/0225362 | A1* | 9/2009 | Akiyama et al. ............. 358/1.15 |

FOREIGN PATENT DOCUMENTS

JP  2009-187243 A  8/2009

* cited by examiner

*Primary Examiner* — Qian Yang
(74) *Attorney, Agent, or Firm* — Marvin A. Motsenbocker; Mots Law, PLLC

(57) ABSTRACT

A printer driver causes a computer to function as: an image formation data generator configured to generate image formation data which includes image data and other data; and an image formation data updater configured to update the image formation data. The image formation data updater is configured to update the image formation data by: judging whether or not a description to secure compatibility of a version of the image formation data exists in the image formation data; if the description exists, adding to the other data an enabling instruction to enable a compatibility securement function to secure the compatibility of the version of the image formation data; and if no description exists, adding to the other data a disabling instruction to disable the compatibility securement function.

8 Claims, 16 Drawing Sheets

FIG.5

```
        M10
         ↓
    <Circles
M20  xmlns="http://schemas.openxmlformats.org/Circles/vi"
     xmlns:mc="http://schemas.openxmlformats.org/markup-compatibility/2006"
     xmlns:v2="http://schemas.openxmlformats.org/Circles/v2"
M30  xmlns:aaa="http:"
M40  mc:MustUnderstand="aaa"
     mc:Ignorable="v2"
M50
     <aaa:Watermark Opacity="v0.1">
         <Circle Center="0,0" Radius="20" Color="Blue" />
M60  </aaa:Watermark>

<v2:Blink>
         <Circle Center="13,0" Radius="20" Color="Yellow" />
         <Circle Center="38,0" Radius="20" Color="Green" />
M70  </v2:Blink>

M80  <mc:AlternateContent>
     <mc:Choice Requires="v2">
         <v2:Circle Center="0,0" Radius="20" Color="Blue" Luminance="13" />
         <v2:Circle Center="50,0" Radius="20" Color="Red" Luminance="13" />
M90  </mc:Choice>
     <mc:Fallback>
         <LuminanceFilter Luminance="13">
          <Circle Center="0,0" Radius="20" Color="Blue" v2:Opacity="0.5" />
          <Circle Center="50,0" Radius="20" Color="Red" v2:Opacity="0.5" />
         </LuminanceFilter>
     </mc:Fallback>
     </mc:AlternateContent>

</Circles>
```

FIG.7A

```
<psf:Feature name="oki:MarkupCompatibilityMode"
  <psf:Option name="oki:On" />
</psf:Feature>
```

FIG.7B

```
<psf:Feature name="oki:MarkupCompatibilityMode"
  <psf:Option name="oki:Off" />
</psf:Feature>
```

FIG.11

| TEST DATASET | No. 1 | No. 2 | No. 3 |
|---|---|---|---|
| NUMBER OF ELEMENTS | 519 (ELEMENTS) | 2014 (ELEMENTS) | 3916 (ELEMENTS) |
| PROCESSING TIME 1 (MARKUP COMPATIBILITY FUNCTION OFF) | 2.595 (sec) | 8.319 (sec) | 17.595 (sec) |
| PROCESSING TIME 2 (MARKUP COMPATIBILITY FUNCTION ON) | 2.836 (sec) | 9.411 (sec) | 18.182 (sec) |
| SPEED INCREASE | 8.5 (%) | 11.7 (%) | 3.3 (%) |

PRINTER DRIVER, INFORMATION PROCESSOR, AND IMAGE FORMATION APPARATUS WITH COMPATIBILITY SECUREMENT FUNCTION

CROSS REFERENCE TO RELATED APPLICATIONS

This application claims priority based on 35 USC 119 from prior Japanese Patent Application No. 2012-090824 filed on Apr. 12, 2012, entitled "PRINTER DRIVER, INFORMATION PROCESSOR, IMAGE FORMATION APPARATUS, IMAGE FORMATION SYSTEM, AND IMAGE FORMATION METHOD", the entire contents of which are incorporated herein by reference.

BACKGROUND OF THE INVENTION

1. Field of the Invention

This disclosure relates to a printer driver, an information processor, an image formation apparatus, an image formation system, and an image formation method.

2. Description of Related Art

In a conventional print system that includes an information processor and an image formation apparatus, the information processor converts print target data, such as document data, to generate print data in a language interpretable by the image formation apparatus, and sends the print data to the image formation apparatus. The image formation apparatus then performs the printing by analyzing the entirety of the print data. For example, multiple versions are set as formats for print data in some cases. In such cases, the image formation apparatus needs to secure the compatibility between the version of the format of the print data, which the image formation apparatus receives from the information processor, and the version supported by the image formation apparatus (see Patent Document 1: Japanese Patent Application Publication No. 2009-187243, for example).

SUMMARY OF THE INVENTION

However, a problem with the related art is that the efficiency of processing for the compatibility is low, because regardless of whether or not the compatibility needs to be secured, the image formation apparatus performs the processing for securing the compatibility between the version of the format of the print data which the image formation apparatus receives from the information processor and the version supported by the image formation apparatus.

An object of an embodiment of the invention is to efficiently perform the processing for securing this compatibility.

A first aspect of the invention is a printer driver that causes a computer to function as an image formation data generator configured to generate image formation data which includes image data and other data, and an image formation data updater configured to update the image formation data. The image formation data updater is configured to update the image formation data by judging whether or not a description to secure compatibility of a version of the image formation data exists in the image formation data. If the description does exist, the image formation data updater adds an enabling instruction to the other data to enable a compatibility securement function to secure the compatibility of the version of the image formation data. If no description exists, the image formation data updater adds a disabling instruction to the other data to disable the compatibility securement function.

A second aspect of the invention is an image formation apparatus that includes a data analyzer and a data acquirer configured to acquire image formation data containing both image data and other data. The data analyzer is configured to judge whether or not the other data includes either (1) an enabling instruction to enable a compatibility securement function to secure compatibility of a version of the image formation data, or (2) a disabling instruction to disable the compatibility securement function. If it is determined that the other data includes the enable instruction, the data analyzer analyzes the image formation data in a compatibility securement enabled mode in which the compatibility securement function is enabled. If it is determined that the other data includes the disable instruction, the data analyzer analyzes the image formation data in a compatibility securement disabled mode in which the compatibility securement function is disabled. The image formation apparatus further includes: an image generator configured to generate an image from the image data on the basis of a result of the analysis by the data analyzer; and an image formation unit configured to form an image on the basis of the image generated by the image generator.

A third aspect of the invention is an image formation apparatus that includes: a data acquirer configured to acquire image formation data which includes image data; a function setting storage unit configured to store function setting information specifying which of (1) a compatibility securement enabled mode to secure compatibility of a version of the image formation data, or (2) a compatibility securement disabled mode to disable securement of the compatibility, is to be used to perform an operation; a data analyzer configured to analyze the image formation data in the compatibility securement enabled mode or the compatibility securement disabled mode on the basis of the function setting information; an image generator configured to generate an image from the image data on the basis of a result of the analysis by the data analyzer, and an image formation unit configured to form an image on the basis of the image generated by the image generator.

A fourth aspect of the invention is an image formation method that includes: acquiring image formation data which contains image data; checking the function setting information that specifies whether a compatibility securement enabled mode to secure compatibility of a version of the image formation data, or a compatibility securement disabled mode to disable securement of the compatibility, is to be used to perform an operation; analyzing the image formation data in the compatibility securement enabled mode or in the compatibility securement disabled mode on the basis of the function setting information; generating an image from the image data on the basis of the result of the analysis by the data analyzer, and forming an image on the basis of the image generated by the image generator.

The aspects enhance the efficiency of processing for securing the compatibility.

BRIEF DESCRIPTION OF THE DRAWINGS

FIG. 5 is a schematic diagram showing an example of a markup compatibility description based on an XPS markup.

FIGS. 7A and 7B are schematic diagrams showing an instruction to enable markup compatibility and an instruction to disable markup compatibility, respectively.

FIG. 11 is a table showing the results of measuring time spent to perform the processing using both the markup compatibility enabled mode and the markup compatibility disabled mode in Embodiment 1.

DETAILED DESCRIPTION OF EMBODIMENTS

Figure 1:
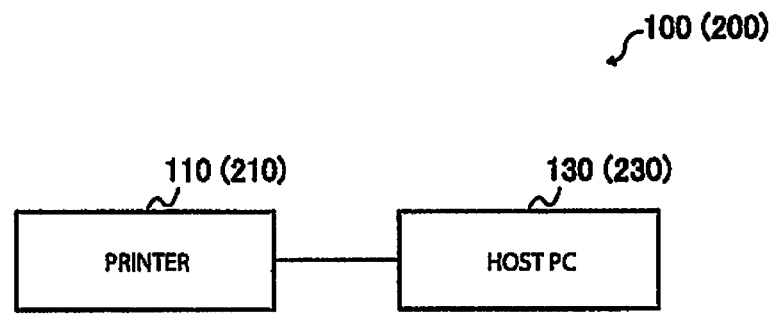
FIG. 1 is a block schematic diagram showing the configuration of a print system of Embodiments 1 and 2.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Embodiment 1

(Explanation of Configuration)

FIG. 1 is a schematic diagram showing the configuration of print system 100 of Embodiment 1. Print system 100 includes printer 110 as an image formation apparatus, and host PC 130 as an information processor. Printer 110 and host PC 130 may be connected together through a network connection using a LAN (Local Area Network), or through a local connection using USB (Universal Serial Bus) ports, parallel ports, IrDA (Infrared Data Association) ports, serial ports, and the like. It should be noted that parenthesized reference numerals represent components of Embodiment 2.

Figure 2:
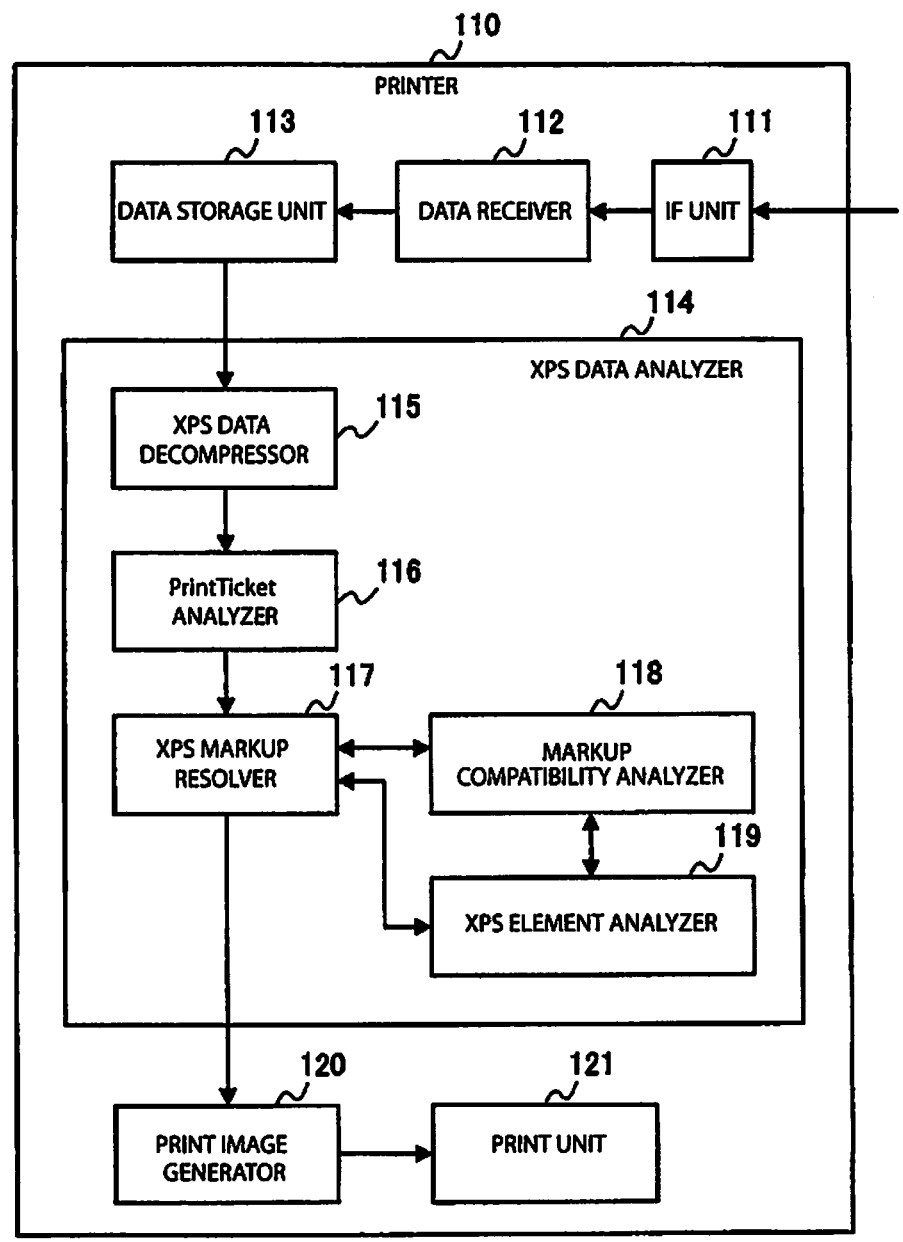
FIG. 2 is a block diagram schematically showing the configuration of a printer of Embodiment 1.

FIG. 2 is a block diagram schematically showing the configuration of printer 110. Printer 110 includes: interface unit (hereinafter referred to as an IF unit) 111; data receiver 112 as a data acquisition unit; data storage unit 113; XPS data analyzer 114 as a data analyzer; print image generator 120 as an image generator; and print unit 121 as an image formation unit.

IF unit 111 executes communication with host PC 130. Data receiver 112 receives XPS data as image formation data from host PC 130 through IF unit 111. Data storage unit 113 stores the received XPS data. XPS data analyzer 114 analyzes the XPS data stored in data storage unit 113, and generates intermediate data, which print image generator 120 can interpret, from the XPS data. Print image generator 120 generates a print image as an image for image formation from the intermediate data generated by XPS data analyzer 114. Print unit 121 performs print processing by use of the print image generated by print image generator 120.

XPS data analyzer 114 includes: XPS data decompressor 115 as a data decompression section; PrintTicket analyzer 116 as a setting analysis section; XPS markup resolver 117 as an element resolution section; markup compatibility analyzer 118 as a compatibility analysis section; and XPS element analyzer 119 as an element analysis section.

XPS data decompressor 115 performs decompression processing on the XPS data using Zip. The XPS data is formatted data which is formed into files by using Zip to compress a group of files having a folder structure. The XPS data decompressed by XPS data decompressor 115 is referred to as decompressed XPS data. PrintTicket analyzer 116 analyzes a PrintTicket file which is a setting file in the decompressed XPS data, and thus judges whether to enable or disable a markup compatibility function (a compatibility securement function) for securing the compatibility of the version of the XPS data. For example, PrintTicket analyzer 116 analyzes whether the PrintTicket file exists in the decompressed XPS data. In addition, PrintTicket analyzer 116 analyzes whether the PrintTicket file includes an enabling instruction for enabling the function for securing the compatibility, or a disabling instruction for disabling the function for securing the compatibility. If the PrintTicket file includes the enabling instruction, PrintTicket analyzer 116 judges that the markup compatibility function should be enabled. On the other hand, if no PrintTicket file exists in the decompressed XPS data, if the PrintTicket file includes neither the enabling instruction nor the disabling instruction, or if the PrintTicket file includes the disabling instruction, PrintTicket analyzer 116 judges that the markup compatibility function should be disabled. It should be noted that the PrintTicket file is the setting data showing settings necessary for forming images, such as an instruction for double-sided printing, an instruction as to the number of copies, and the like.

XPS markup resolver 117 performs its processing in a markup compatibility enabled mode being a mode in which the compatibility securement function is enabled, if PrintTicket analyzer 116 judges that the markup compatibility function should be enabled. On the other hand, XPS markup resolver 117 performs its processing in a markup compatibility disabled mode being a mode in which the compatibility securement function is disabled, if PrintTicket analyzer 116 judges that the markup compatibility function should be disabled. For example, in the markup compatibility enabled mode, XPS markup resolver 117 resolves the decompressed XPS data on an element-by-element basis in the XPS markup; provides each element to markup compatibility analyzer 118; causes markup compatibility analyzer 118 to perform compatibility securing processing; and causes XPS element analyzer 119 to generate intermediate data through its processing. On the other hand, in the markup compatibility disabled mode, XPS markup resolver 117 resolves the decompressed XPS data on an element-by-element basis in the XPS markup; provides each element to XPS element analyzer 119; and causes XPS element analyzer 119 to generate intermediate data through its processing.

Markup compatibility analyzer 118 performs compatibility securing processing for implementing the markup compatibility function on each element provided from XPS markup resolver 117.

XPS element analyzer 119 generates the intermediate data by performing a language analysis on: each element resolved by XPS markup resolver 117; and each element subjected to the compatibility securing processing by markup compatibility analyzer 118.

Figure 3:
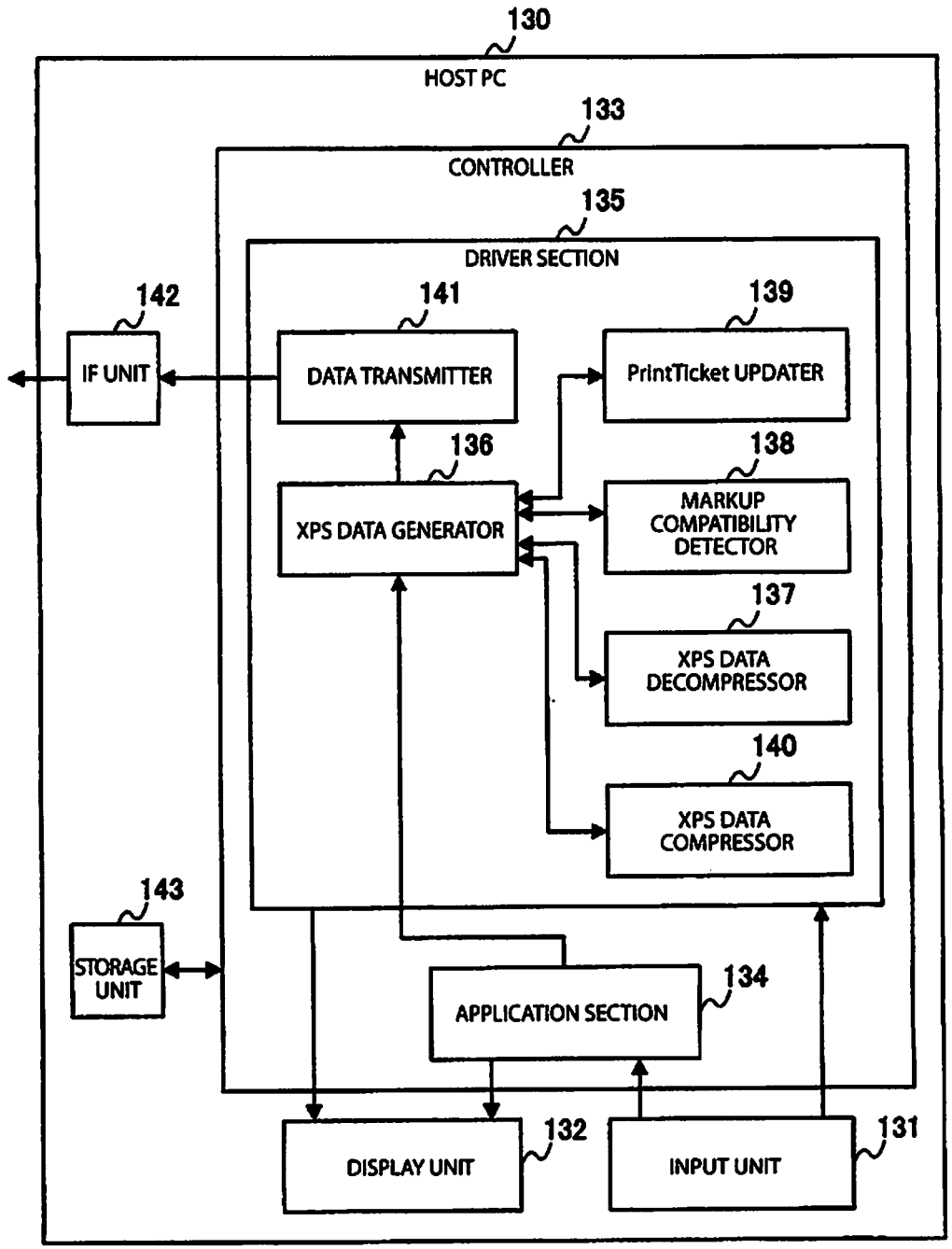
FIG. 3 is a block diagram schematically showing the configuration of a host PC of Embodiment 1.

FIG. 3 is a block diagram schematically showing the configuration of host PC 130. Host PC 130 includes input unit 131, display unit 132, controller 133, IF unit 142, and storage unit 143.

Input unit 131 receives an instruction. Display unit 132 displays an image. Controller 133 generates the XPS data in accordance with the instruction from the input unit 131. IF unit 142 executes communication with printer 110. Storage unit 143 stores information needed for controller 133 to performs its processing.

Controller 133 includes application section 134 and driver section 135. Application section 134 generates print target data such as document data, and generates a spool file from the print target data in accordance with the instruction from input unit 131. The spool file is temporary data copied from the print target data, which application section 134 transfers to driver section 135. Driver section 135 generates the XPS data adaptable to printer 110. For example, driver section 135 generates the XPS data from the spool file generated by application section 134. Driver section 135 includes: XPS data generator 136 as a section for generating image formation data; XPS data decompressor 137 as a section for data decompression; markup compatibility detector 138 as a section for detecting a compatibility securing description; PrintTicket updater 139 as a section for updating the setting data; XPS data compressor 140 as a section for data compression; and data transmitter 141 as a section for data output. In this respect, XPS data decompressor 137, markup compatibility detector 138, PrintTicket updater 139 and XPS data compressor 140 collectively constitute an image formation data updating section.

XPS data generator 136 generates the XPS data from the spool file provided by application section 134. XPS data decompressor 137 decompresses the XPS data which is compressed using Zip. In this respect, the thus-decompressed XPS data is referred to as decompressed temporary XPS data. Markup compatibility detector 138 checks whether or not a markup compatibility description, or in other words, a description for securing the compatibility of the version of the XPS data, exists in a group of files in the decompressed temporary XPS data. PrintTicket updater 139 updates a PrintTicket file. For example, if markup compatibility detector 138 judges that the markup compatibility description exists in the group of files in the decompressed temporary XPS data, PrintTicket updater 139 additionally writes the enabling instruction for enabling the compatibility securement function in the PrintTicket file. On the other hand, if markup compatibility detector 138 judges that no markup compatibility description exists in the group of files in the decompressed temporary XPS data, PrintTicket updater 139 additionally writes the disabling instruction for disabling the compatibility securement function in the PrintTicket file. After PrintTicket updater 139 updates the PrintTicket file, XPS data compressor 140 generates the XPS data by compressing the decompressed temporary XPS data using Zip. The thus-generated XPS data is referred to as XPS data with a compatibility instruction. Data transmitter 141 transmits the XPS data generated by XPS data compressor 140 to printer 110 via IF unit 142.

Print system 100 described above can be realized, for example, by using a general computer including: a CPU (Central Processing Unit); a memory; an external storage device such as a HDD (Hard Disk Drive); a reading/writing device for reading and writing information from or onto a portable storage medium such as a CD (Compact Disk) or a DVD (Digital Versatile Disk); input devices such as a keyboard and a mouse; an output device such as a display; and a communication device, such as a NIC (Network Interface Card), for establishing connection to a communication network. For example, storage unit 143 can be realized by use of the memory or the external storage device by the CPU. Controller 133 can be implemented by loading a predetermined program stored in the external storage device or the memory, and causing the CPU to execute the predetermined program. Input unit 131 can be realized by use of the input devices by the CPU. Display unit 132 can be realized by use of the output device by the CPU. IF unit 142 can be realized by use of the communication device by the CPU. The predetermined program may be executed by the CPU after it is downloaded into the external storage device from the storage medium via the reading/writing device, or downloaded from the network via the communication device, and thereafter is loaded onto the memory. Otherwise, the predetermined program may be executed by the CPU after it is directly loaded into the memory from storage medium 904 via the reading/writing device, or from the network via the communication device. It should be noted that in the embodiment, driver section 135, for example, can be implemented by causing the CPU to execute a printer driver (program) stored in storage unit 143 after loading the printer driver into the memory. In addition, application section 134 can be also implemented by causing the CPU to execute an application (program) stored in storage unit 143 after loading the application into the memory.

Figure 4:
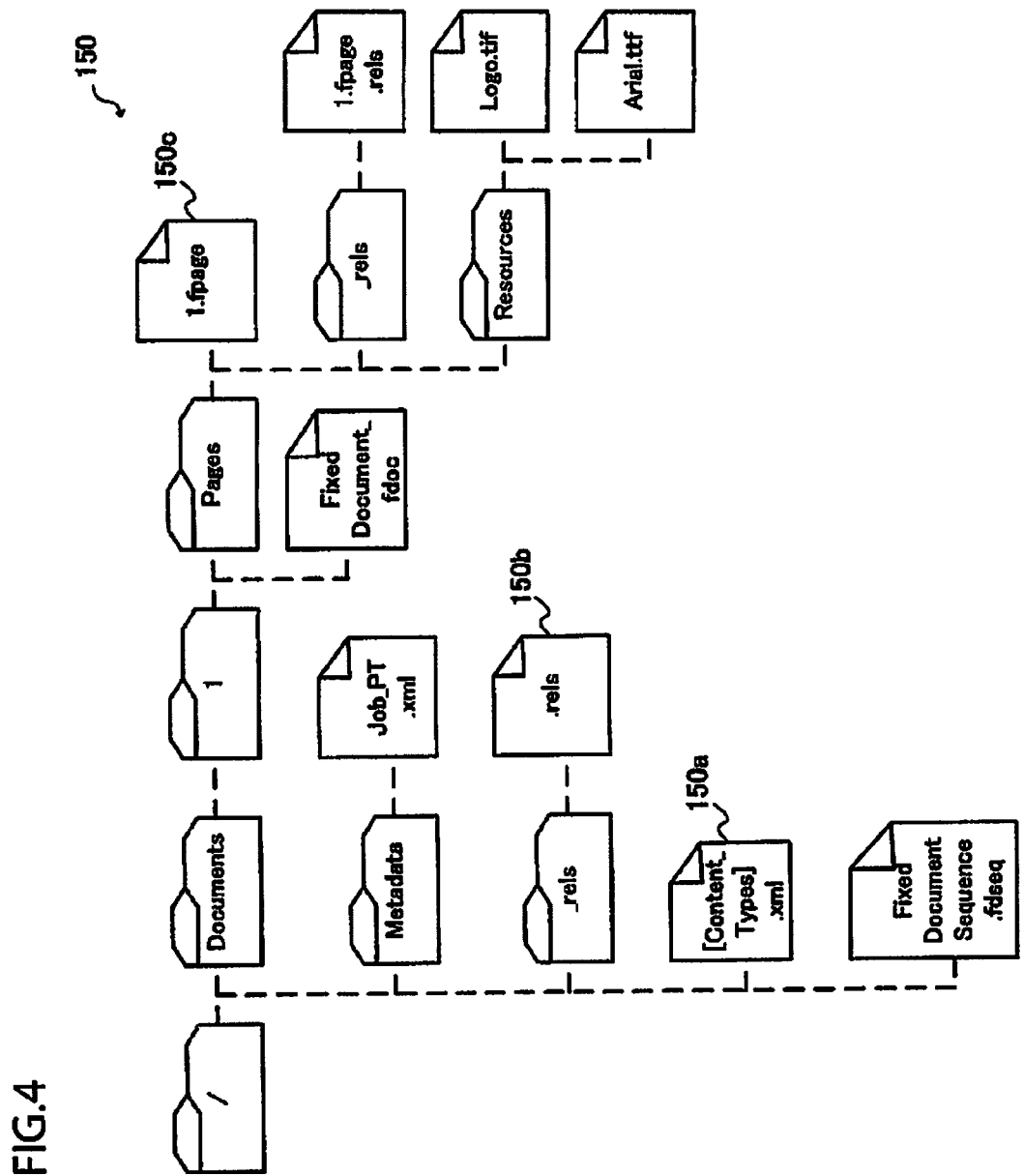
FIG. 4 is a schematic diagram showing an example of the file composition of XPS data as decompressed in Embodiment 1.

FIG. 4 is a schematic diagram showing an example of the file composition of XPS data 150 as decompressed. XPS data 150 always includes [Content_Types].xml file 150*a*, and _rles/.ries file 150*b*. By analyzing these two files, printer 110 thereafter can judge which file should be analyzed and how. In the case of PrintTicket file, where PrintTicket should be stored is described in [Content_Types].xml file 150*a*. With reference to the print setting, printer 110 first of all analyzes the PrintTicket file. XPS data 150 includes an image data file and a font file in their original file formats. The image data file and the font file correspond to image data that represents an image to be formed.

FIG. 5 is a schematic diagram showing an example of the markup compatibility description by XPS markup. For example, the description shown in FIG. 5 is part of the description in 1.fpage file 150*c* which is shown in FIG. 4. Instead, the description shown in FIG. 5 may be written in another file.

An element denoted by reference sign M10 is an XPS element "Circles." A description denoted by reference sign M20 is a namespace for expressing markup compatibility.

A description denoted by reference sign M30 specifies that an element defined by a namespace "aaa" always has to be analyzable.

A description denoted by reference sign M40 specifies that an element defined by a namespace "v2" may be ignored if the element is not analyzable.

A description denoted by reference sign M50 is an element "Watermark" corresponding to a namespace which is defined by the description denoted by reference sign M30. On the basis of the description denoted by reference sign M30, this element always has to be analyzable. If printer 110 is unable to analyze this element, printer 110 has to define the XPS data as an error.

A description denoted by reference sign M60 is an element "Blink" corresponding to a namespace which is defined by the description denoted by reference sign M40. On the basis of the description denoted by reference sign M40, printer 110 may ignore this element if printer 110 is unable to analyze the element.

An element denoted by reference sign M70 includes a Choice element denoted by reference sign M80, and a Fallback element denoted by reference sign M90. A description denoted by reference sign M70 specifies that: if printer 110 is able to interpret the namespace "v2," printer 110 analyzes the Choice element denoted by reference sign M80; and if printer 110 is unable to interpret the namespace "v2," printer 110 analyzes the Fallback element denoted by reference sign M90.

(Explanation of Operations)

Explanation is hereinbelow provided for operations of the print system 100 of Embodiment 1.

Figure 6:
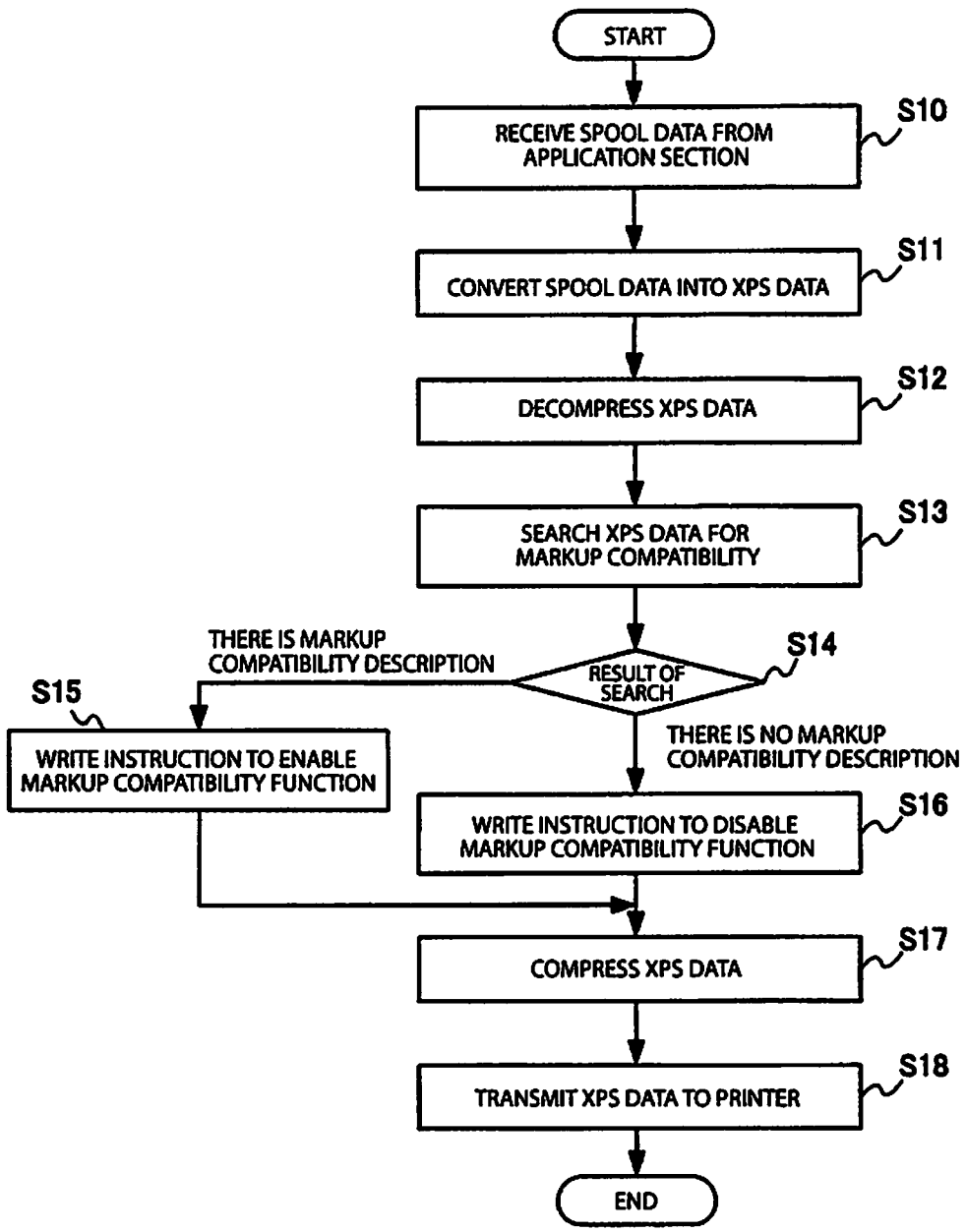
FIG. 6 is a flowchart showing the processing which a driver section of the host PC of Embodiment 1 performs.

FIG. 6 is a flowchart showing the processing performed by driver section 135 of the host PC of Embodiment 1. Once a print instruction is received (an image formation instruction) from the user via input unit 131, application section 134 generates the spool data, and provides this spool data to driver section 135.

Driver section 135 receives the spool data from application section 134 (S10). On the basis of the received spool data, XPS data generator 136 generates the XPS data (S11).

XPS data decompressor 137 generates the decompressed temporary XPS data by decompressing the XPS data which is compressed by XPS data generator 136 (S12).

Markup compatibility detector 138 searches files included in the decompressed temporary XPS data, generated by XPS data decompressor 137, for a markup compatibility description (S13). For example, if a namespace "http://schemas.openxmlformats.org/markup-compatibility/2006" is included in any one of the files, markup compatibility detector 138 judges that the markup compatibility description is included therein. In this respect, markup compatibility detector 138 searches all the files included in the decompressed temporary XPS data, except the image data file and the font data file. Thereafter, if the result of the search (S13) is that the markup compatibility description is included therein (Yes in S14), markup compatibility detector 138 proceeds to a process in step S15. If no markup compatibility description is included therein (No in S14), markup compatibility detector 138 proceeds to a process in step S16.

In step S15, PrintTicket updater 139 adds a description indicating the enable instruction for enabling the markup compatibility function to the PrintTicket file in the decompressed temporary XPS data. For example, PrintTicket updater 139 adds the description shown in FIG. 7A to the PrintTicket file.

On the other hand, in step S16, PrintTicket updater 139 adds a description indicating the disable instruction for disabling the markup compatibility function to the PrintTicket file in the decompressed temporary XPS data. For example, PrintTicket updater 139 adds the description shown in FIG. 7B to the PrintTicket file.

Thereafter, XPS data compressor 140 generates the XPS data by compressing the decompressed temporary XPS data, in which the PrintTicket file is updated, by using Zip (S17). DATA transmitter 141 transmits the XPS data generated by XPS data compressor 140 to printer 110 via IF unit 142 (S18).

Figure 8:
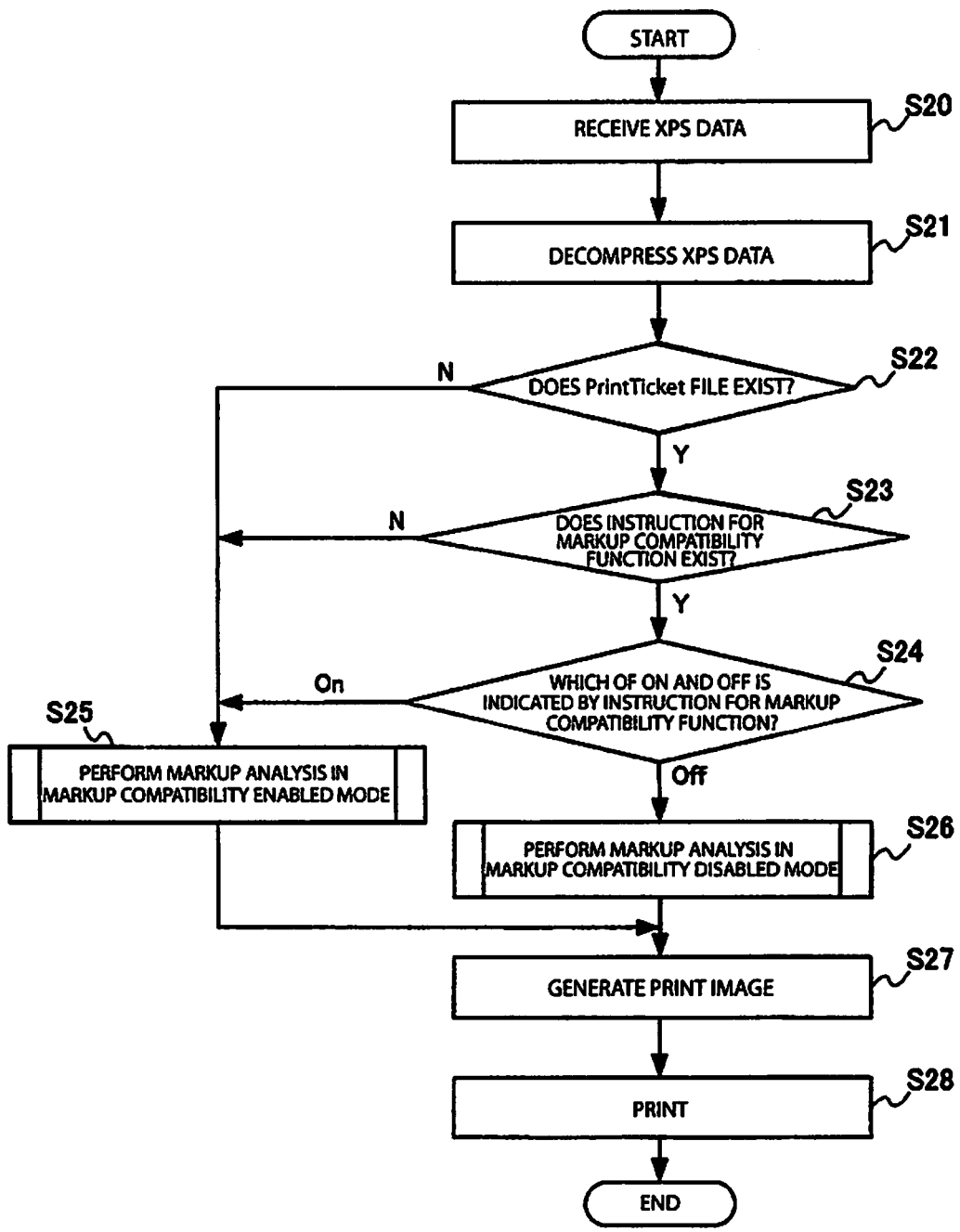
FIG. 8 is a flowchart showing the processing which the printer of Embodiment 1 performs.

FIG. 8 is a flowchart showing processing performed by printer 110. Once the XPS data is received via IF unit 111 (S20), data receiver 112 of printer 110 stores the received XPS data into data storage unit 113.

XPS data decompressor 115 generates the decompressed XPS data by decompressing the XPS data stored in data storage unit 113 (S21).

PrintTicket analyzer 116 checks whether or not the PrintTicket file exists in any of the files included in the decompressed XPS data (S22). If the PrintTicket file exists in any of the files included in the decompressed XPS data (Yes in S22), PrintTicket analyzer 116 proceeds to the process in step S23. If the PrintTicket file does not exist in any of the files included in the decompressed XPS data (No in S22), PrintTicket analyzer 116 proceeds to the process in step S25.

In step S23, PrintTicket analyzer 116 checks whether or not the PrintTicket file includes either one of an instruction for enabling the markup compatibility function, or an instruction for disabling the markup compatibility function. If the PrintTicket file includes one of the instructions (Yes in step S23), PrintTicket analyzer 116 proceeds to the process in step S24. If the PrintTicket file does not include any of the instructions (No in step S23), PrintTicket analyzer 116 proceeds to the process in step S25.

In step S24, PrintTicket analyzer 116 checks which of the enabling instruction (On) and the disabling instruction (Off) is indicated by the instruction for the markup compatibility function in the PrintTicket file. In this respect, if the description as shown in FIG. 7A exists in the PrintTicket file, PrintTicket analyzer 116 judges that this description indicates the enable instruction. If the description as shown in FIG. 7B exists in the PrintTicket file, PrintTicket analyzer 116 judges that this description indicates the disable instruction. Thereafter, in the case of the enable instruction (On in step S24), PrintTicket analyzer 116 proceeds to the process in step S25. In the case of the disable instruction (Off in step S24), PrintTicket analyzer 116 proceeds to the process in step S26.

In step S25, in the markup compatibility enabled mode, XPS markup resolver 117 makes markup compatibility analyzer 118 and XPS element analyzer 119 perform the markup analysis as well as generate the intermediate data. The processing in this respect is described shortly in detail with reference to FIG. 9.

On the other hand, in step S26, in the markup compatibility disabled mode, XPS markup resolver 117 makes XPS element analyzer 119 perform the markup analysis and generate the intermediate data. The processing in this respect is described in detail later with reference to FIG. 10.

Thereafter, print image generator 120 generates the print image from the intermediate data provided by XPS markup resolver 117 (step S27). Subsequently, print unit 121 performs the printing on the basis of the print image generated by print image generator 120 (step S28).

Figure 9:
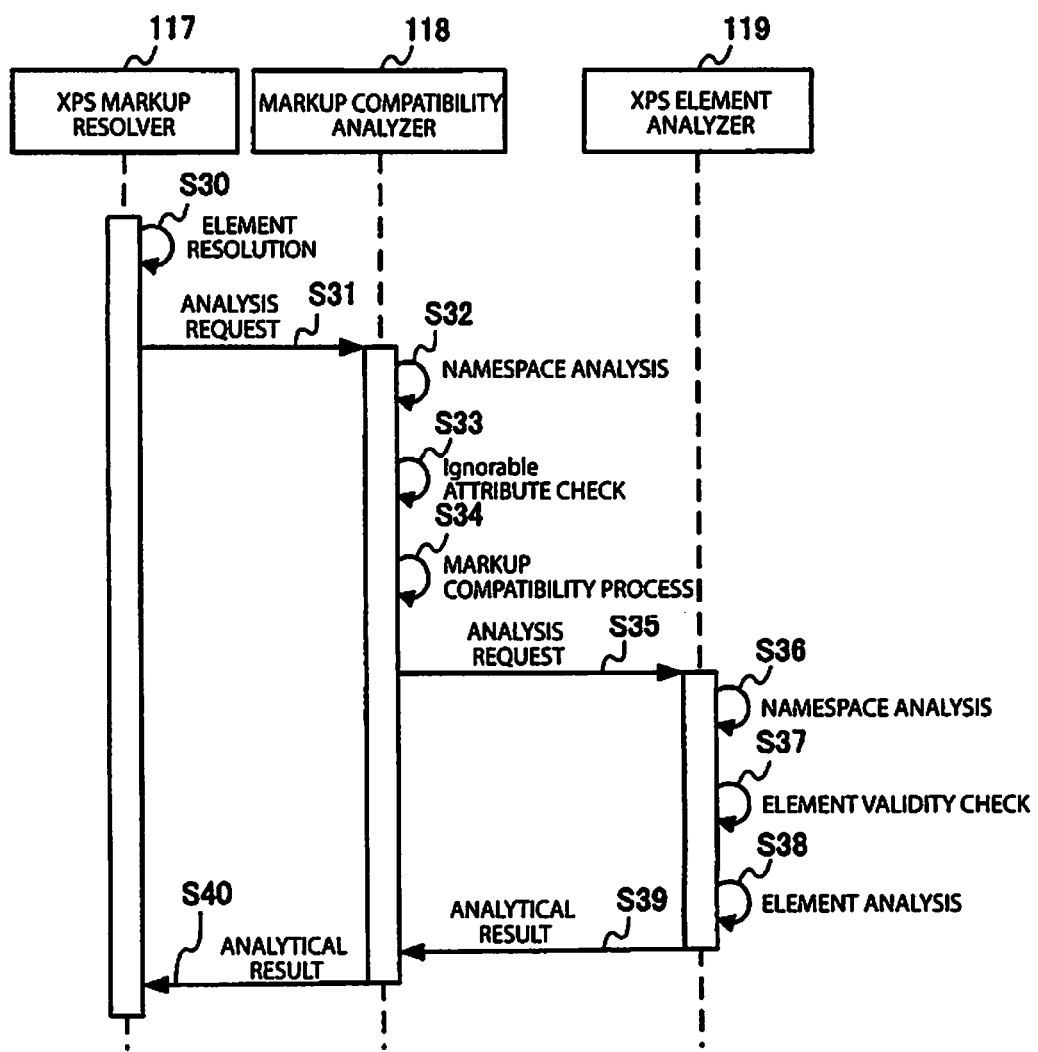
FIG. 9 is a flowchart showing the analytical processing to be performed in a markup compatibility enabled mode in Embodiment 1.

FIG. 9 is a flowchart showing the analytical processing to be performed in the markup compatibility enabled mode. XPS markup resolver 117 resolves the XPS markup description on an element-by-element basis (step S30). Subsequently, XPS markup resolver 117 provides each resolved element to markup compatibility analyzer 118, and requests markup compatibility analyzer 118 to perform the analysis (step S31).

Markup compatibility analyzer 118 checks whether or not each resolved element includes the namespace defined as markup compatibility (step S32). For example, markup compatibility analyzer 118 checks whether or not there exists an element including the namespace denoted by reference sign M30 or M40, as explained by use of FIG. 5.

Thereafter, markup compatibility analyzer 118 checks whether or not the element which includes the namespace defined as markup compatibility is subjected to the assignment of an Ignorable attribute, for example, as denoted by reference sign M90 in FIG. 5 (step S33). In the case of the element to which the Ignorable attribute is assigned, markup compatibility analyzer 118 judges whether to ignore the element by checking the version supported by printer 110 to which markup compatibility analyzer 118 belongs. Subsequently, if markup compatibility analyzer 118 judges not to ignore the element, markup compatibility analyzer 118 treats the element as an analysis target element. In addition, markup compatibility analyzer 118 treats the element specified as always having to be analyzed, and as the analysis target element as well.

Furthermore, markup compatibility analyzer 118 checks whether or not the resolved elements include elements one of which should be alternatively selected, as denoted by reference sign M70 in FIG. 5. Subsequently, markup compatibility analyzer 118 performs a markup compatibility process on the elements to be alternatively selected (step S34). Markup compatibility analyzer 118 checks which of the two elements should be selected, and treats the selected element as the analysis target element. For example, in the case of an element "AlternateContent" denoted by reference sign M70 in FIG. 5, if the namespace "v2" can be analyzed with the version supported by printer 110 to which markup compatibility analyzer 118 belongs, markup compatibility analyzer 118 treats the element denoted by reference sign M80 as the analysis target element. If the namespace "v2" cannot be analyzed with the version, markup compatibility analyzer 118 treats the element denoted by reference sign M90 as the analysis target element.

Markup compatibility analyzer 118 provides XPS element analyzer 119 with the element which markup compatibility analyzer 118 judges as the analysis target element in steps S32 to S34, and requests XPS element analyzer 119 to analyze the analysis target element (step S35).

If the element thus provided includes a namespace, XPS element analyzer 119 checks whether or not the namespace is analyzable (step S36). In addition, XPS element analyzer 119 checks whether or not the XPS markup description included in the provided element is analyzable (step S37). Subsequently, XPS element analyzer 119 analyzes the provided element, and generates the intermediate data which print image generator 120 can interpret (step S38). Incidentally, if XPS element analyzer 119 judges that XPS element analyzer 119 cannot perform the analyses in steps S36 and S37, XPS element analyzer 119 performs a predetermined error process. If XPS element analyzer 119 performs such an error process, XPS element analyzer 119 generates no intermediate data. As a consequence, no printing is carried out on the basis of the received XPS data.

XPS element analyzer 119 provides markup compatibility analyzer 118 with the generated intermediate data as the analytical result (step S39). Markup compatibility analyzer 118 provides XPS markup resolver 117 with this intermediate data as the analytical result (step S40).

Figure 10:
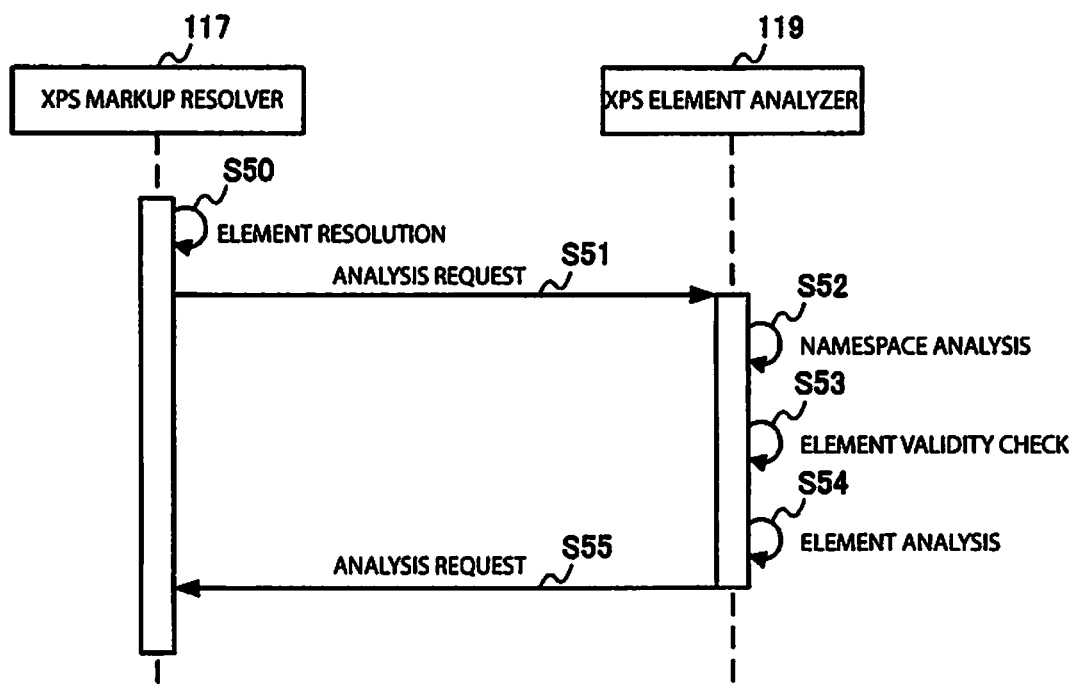
FIG. 10 is a flowchart showing the analytical processing to be performed in a markup compatibility disabled mode in Embodiment 1.

FIG. 10 is a flowchart showing the analytical processing to be performed in the markup compatibility disabled mode. XPS markup resolver 117 resolves the XPS markup description on an element-by-element basis (step S50). XPS markup resolver 117 provides each resolved element to XPS element analyzer 119, and requests XPS element analyzer 119 to perform an analysis (step S51).

If the provided element includes a namespace, XPS element analyzer 119 checks whether or not the namespace is analyzable (step S52). In addition, XPS element analyzer 119 checks whether or not the XPS markup description included in the provided element is analyzable (step S53). Subsequently, XPS element analyzer 119 analyzes the provided element, and generates intermediate data which print image generator 120 can interpret (step S54). Incidentally, if XPS element analyzer 119 judges that XPS element analyzer 119 cannot perform the analyses in steps S52 and S53, XPS element analyzer 119 performs a predetermined error process. If XPS element analyzer 119 performs such an error process, XPS element analyzer 119 generates no intermediate data. For this reason, no printing is carried out on the basis of the received XPS data.

XPS element analyzer 119 provides XPS markup resolver 117 with the generated intermediate data as the analytical result (step S55).

FIG. 11 is a table showing the results of measuring the amount of time spent to perform the processing on the XPS data, which includes no markup compatibility description, in the markup compatibility enabled mode and in the markup compatibility disabled mode. Although the amount of time spent to perform the processing varies from one dataset to another, the markup compatibility disabled mode performs the processing at a faster speed by approximately 7.8% on average than the processing in the markup compatibility enabled mode, as shown in FIG. 11. It should be noted that although the amount of time spent to perform the processes (in steps S12 to S17), which are to be additionally processed by host PC 130, in the flowchart shown in FIG. 6 depends on the performance of host PC 130, the influence of the amount of time is negligible. That is because the frequency of a CPU of a commercially-available personal computer is generally 100 or more times faster than the frequency of the CPU of printer 110.

As described above, Embodiment 1 enables host PC 130 to check whether or not the XPS data includes the markup compatibility description, and to inform printer 110 of the result of the check by use of the PrintTicket file. For this reason, if the XPS data includes no markup compatibility description, printer 110 can perform the markup analysis while disabling the markup compatibility function. This makes it possible to increase the processing speed on the XPS data. In addition, this reduces the process load on printer 110 and a power-saving effect of printer 110 is also expected.

Embodiment 2

Embodiment 2 shows a case in which XPS data is directly printed by using no printer driver.
(Explanation of Configuration)

As shown in FIG. 1, print system 200 of Embodiment 2 includes printer 210 and post PC 230.

Figure 12:
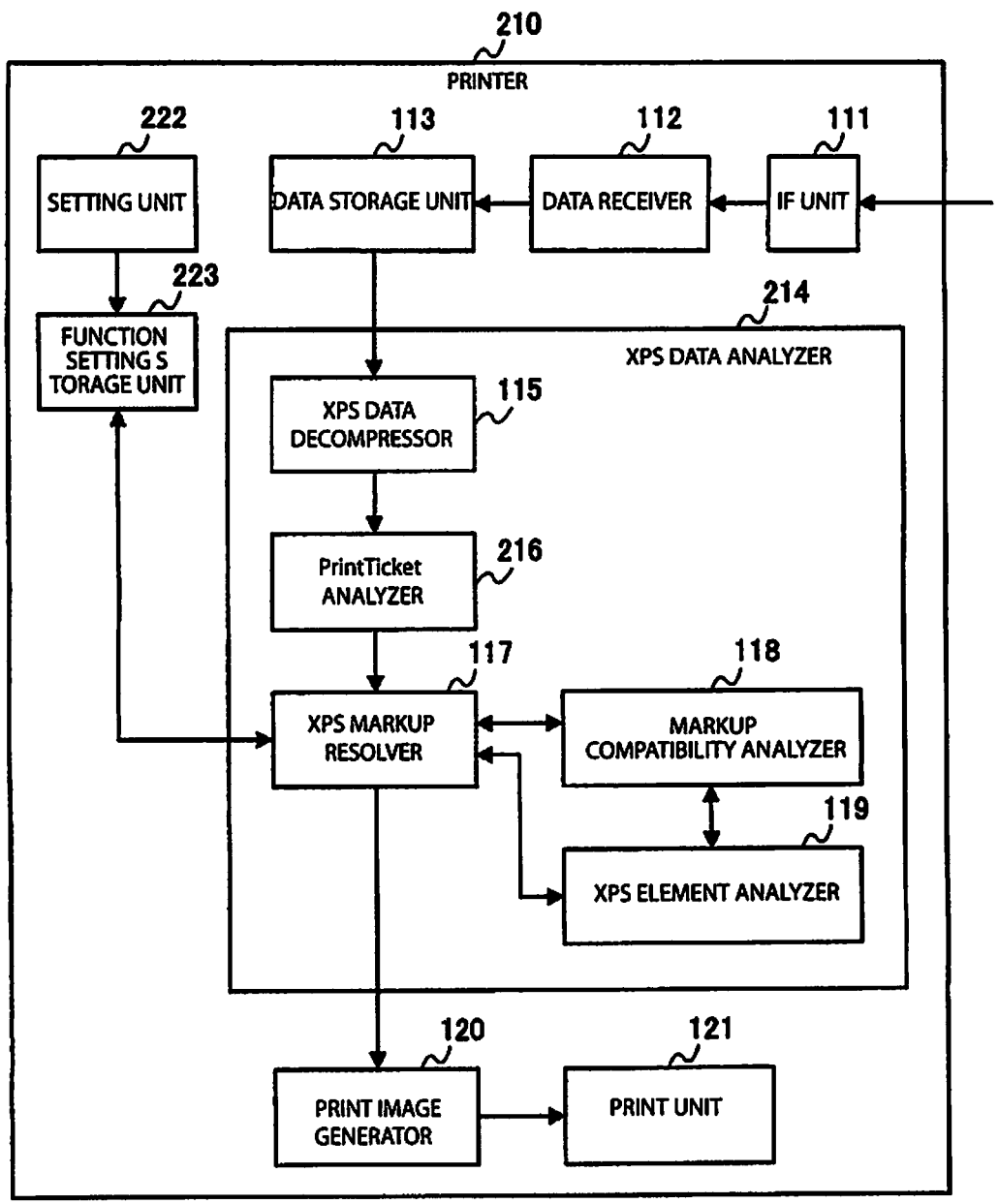
FIG. 12 is a block diagram schematically showing the configuration of a printer of Embodiment 2.

FIG. 12 is a block diagram schematically showing the configuration of printer 210 of Embodiment 2. Printer 210 includes IF unit 111, data receiver 112, data storage unit 113, XPS data analyzer 214, print image generator 120, print unit 121, setting unit 222, and function setting storage unit 223. Printer 210 of Embodiment 2 is different from printer 110 of Embodiment 1 in terms of a process by XPS data analyzer 214, and in that printer 210 of Embodiment 2 includes setting unit 222 and function setting storage unit 223.

Figure 13:
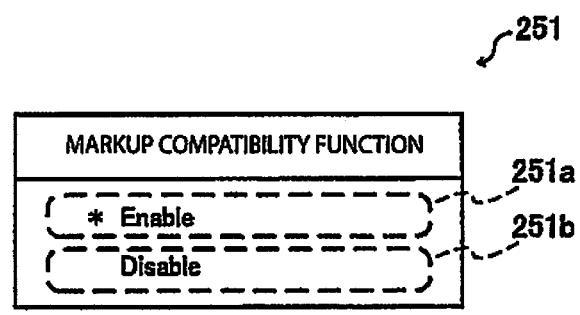
FIG. 13 is a schematic diagram showing an example of a markup compatibility operational mode setting menu screen of Embodiment 2.

Setting unit 222 receives settings of an operational mode of the markup compatibility function. For example, setting unit 222 may include a touch panel and the like. Setting unit 222 receives the operational mode by, for example, displaying markup compatibility operational mode setting menu screen 251 as shown in FIG. 13. FIG. 13 is a schematic diagram showing an example of markup compatibility operational mode setting menu screen 251. Markup compatibility operational mode setting menu screen 251 includes Enable input area 251a and Disable input area 251b. Once the user of printer 210 touches Enable input area 251a, setting unit 222 judges that a setting of the markup compatibility enabled mode for enabling the markup compatibility function is inputted, and makes function setting storage unit 223 store function setting information indicating the operational mode. It should be noted that in the embodiment, the setting provided in the PrintTicket file is prioritized over the operational mode which setting unit 222 receives. Function setting storage unit 223 stores the function setting information on which of the markup compatibility enabled mode and the markup compatibility disabled mode XPS data analyzer 214 should be operated in.

XPS data analyzer 214 analyzes the XPS data stored in the data storage unit 113 and generates from the XPS data intermediate data which print image generator 120 can interpret. In this respect, XPS data analyzer 214 includes XPS data decompressor 115, PrintTicket analyzer 216, XPS markup resolver 117, markup compatibility analyzer 118, and XPS element analyzer 119. XPS data analyzer 214 of Embodiment 2 is different from XPS data analyzer 114 of Embodiment 1 in terms of the processing to be performed by PrintTicket analyzer 216.

PrintTicket analyzer 216 analyzes the PrintTicket file, and thereby judges whether to enable or disable the markup compatibility function. For example, PrintTicket analyzer 216 analyzes whether or not the PrintTicket file exists in the decompressed XPS data. In addition, PrintTicket analyzer 216 analyzes whether or not the PrintTicket file includes an enable instruction for enabling a compatibility securement function or a disable instruction for disabling the compatibility securement function. If the PrintTicket file includes the enabling instruction, PrintTicket analyzer 216 judges that the markup compatibility function should be enabled. On the other hand, if no PrintTicket file exists in the decompressed XPS data, or if the PrintTicket file includes neither the enable instruction nor the disable instruction, PrintTicket analyzer 216 checks the operational mode stored in function setting storage unit 223, and judges whether to enable or disable the markup compatibility function in accordance with the operational mode. Furthermore, if the PrintTicket file includes the disable instruction, PrintTicket analyzer 216 judges that the markup compatibility function should be disabled.

Figure 14:
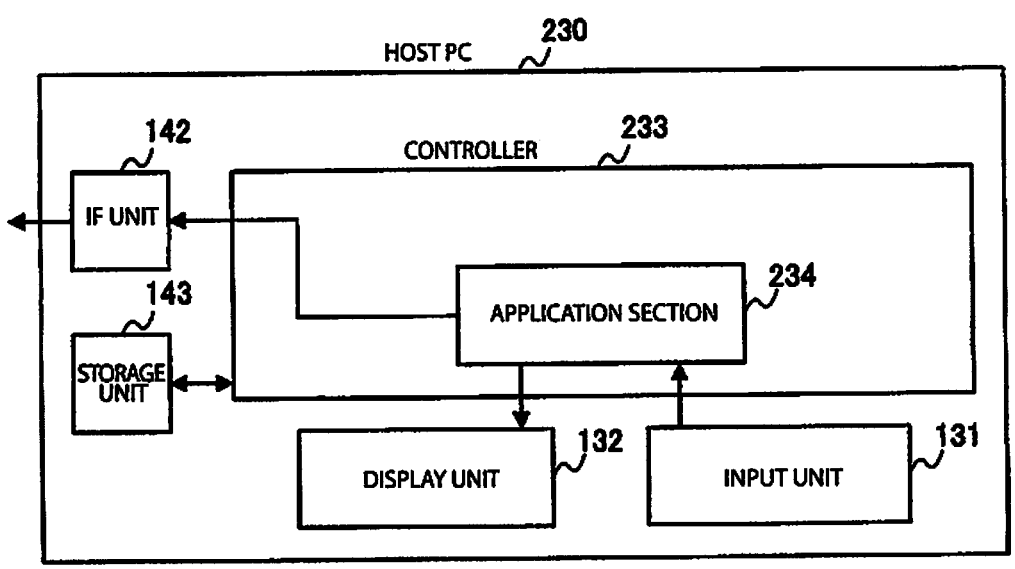
FIG. 14 is a block diagram schematically showing the configuration of a host PC of Embodiment 2.

FIG. 14 is a block diagram schematically showing the configuration of host PC 230 of Embodiment 2. Host PC 230 includes input unit 131, display unit 132, controller 233, IF unit 142, and storage unit 143. Host PC 230 of Embodiment 2 is different from host PC 130 of Embodiment 1 in terms of the processing to be performed by controller 233.

Controller 233 generates XPS data in accordance with an instruction from input unit 131. In this respect, controller 233 of Embodiment 2 is different from controller 133 of Embodiment 1 in that: controller 233 includes no driver section; and application section 234 generates the XPS data. Application section 234 generates print target data, such as document data, and generates a spool file from the print target data in accordance with the instruction from input unit 131, as well as generates the XPS data from this spool file.

(Explanation of Operations)

Descriptions are hereinbelow provided for operations of print system 200 of Embodiment 2.

Figure 15:
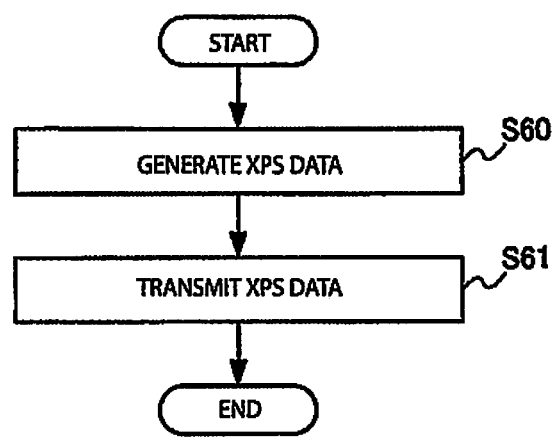
FIG. 15 is a flowchart showing the processing which an application section of the host PC of Embodiment 2 performs.

FIG. 15 is a flowchart showing the processing performed by application section 234 of host PC 230 of Embodiment 2.

Once a print instruction (an image formation instruction) is received from the user via input unit 131, application section 234 generates the spool data from the document data or the like which is designated as the print target, and generates the XPS data on the basis of this spool data (step S60). Subsequently, application section 234 transmits the generated XPS data to printer 210 via IF unit 142 (step S61).

Figure 16:
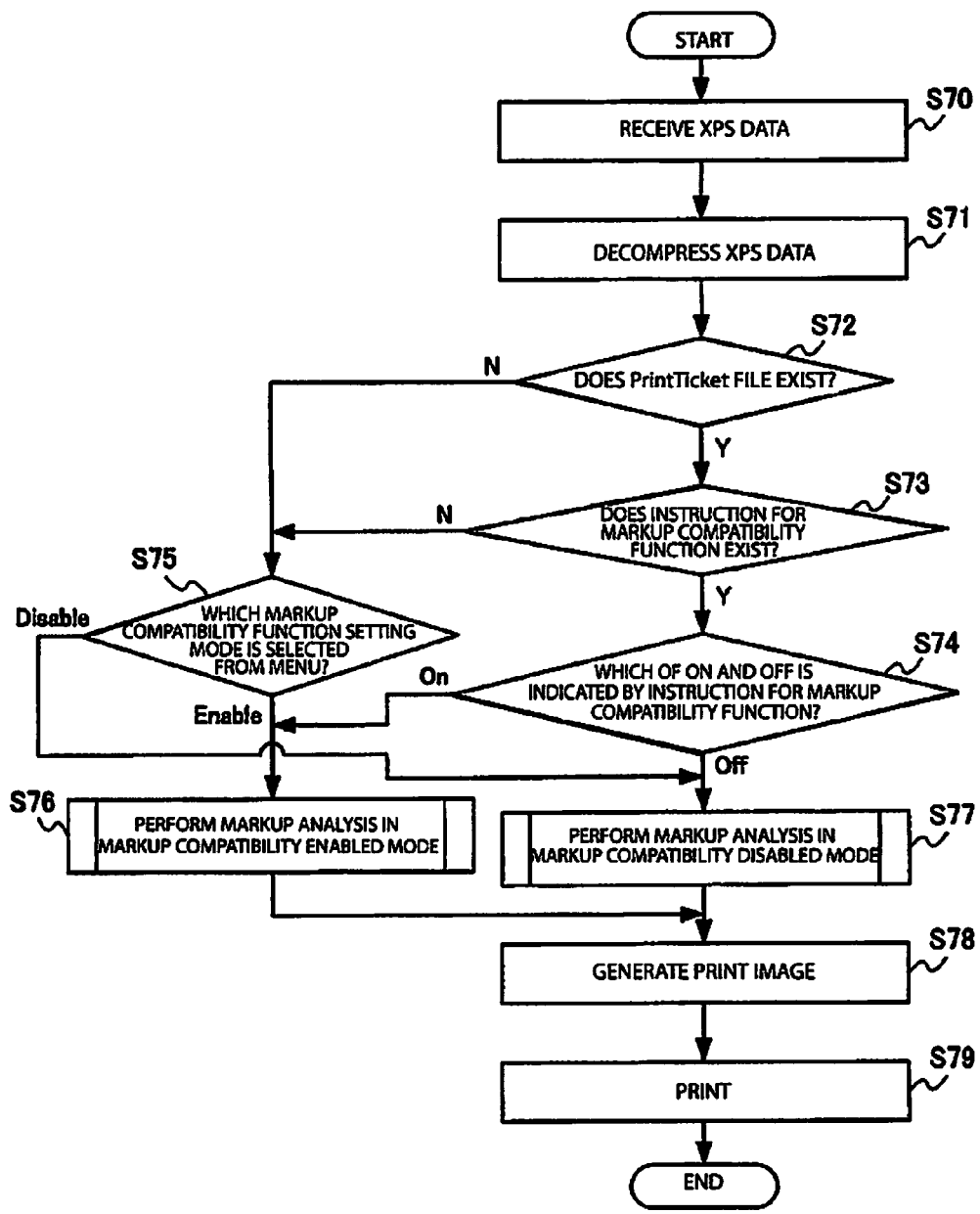
FIG. 16 is a flowchart showing the processing which the printer of Embodiment 2 performs.

FIG. 16 is a flowchart showing the processing to be performed by printer 210. Once data receiver 112 of printer 210 receives the XPS data via IF unit 111 (step S70), data receiver 122 makes data storage unit 113 store the received XPS data.

XPS data decompressor 115 generates decompressed XPS data by decompressing the XPS data stored in data storage unit 113 (step S71).

PrintTicket analyzer 216 checks whether or not the PrintTicket file exists in any of the files included in the decompressed XPS data (step S72). If the PrintTicket file exists in any of the files included in the decompressed XPS data (Yes in step S72), PrintTicket analyzer 216 proceeds to the process in step S73. If the PrintTicket file does not exist in any of the files included in the decompressed XPS data (No in step S72), PrintTicket analyzer 216 proceeds to the process in step S75.

In step S73, PrintTicket analyzer 216 checks whether or not the PrintTicket file includes any one of an instruction for enabling the markup compatibility function and an instruction for disabling the markup compatibility function. If the PrintTicket file includes one of the instructions (Yes in step S73), PrintTicket analyzer 216 proceeds to a process in step S74. If the PrintTicket file does not include any of the instructions (No in step S73), PrintTicket analyzer 216 proceeds to the process in step S75.

In step S74, PrintTicket analyzer 216 checks which of the enable instruction (On) and the disable instruction (Off) is indicated by the instruction for the markup compatibility function in the PrintTicket file. In the case of the enable instruction (On in step S74), PrintTicket analyzer 216 proceeds to the process in step S76. In the case of the disable instruction (Off in step S74), PrintTicket analyzer 216 proceeds to the process in step S77.

In step S75, PrintTicket analyzer 216 checks the function setting information which is stored in function setting storage unit 223. If the operational mode specified by the function setting information is Enable (the markup compatibility enabled mode), PrintTicket analyzer 216 proceeds to the process in step S76. If the operational mode specified by the function setting information is Disable (the markup compatibility disabled mode), PrintTicket analyzer 216 proceeds to the process in step S77.

In step 76, in the markup compatibility enabled mode, XPS markup resolver 117 makes markup compatibility analyzer 118 and XPS element analyzer 119 perform a markup compatibility analysis and generate intermediate data. The processing in this respect is the same as that shown in FIG. 9.

In step 77, in the markup compatibility disabled mode, XPS markup resolver 117 makes markup compatibility analyzer 118 and XPS element analyzer 119 perform the markup compatibility analysis and generate the intermediate data. The processing in this respect is the same as that shown in FIG. 10.

Subsequently, print image generator 120 generates a print image from the intermediate data provided by XPS markup resolver 117 (step S78). Thereafter, print unit 121 performs the printing on the basis of the print image generated by print image generator 120 (step S79).

As described above, print system 200 of Embodiment 2 makes it possible to provide printer 210 with the settings for the markup compatibility operation in advance. This enables faster printing by performing the printing in the markup compatibility disabled mode in the case of direct printing, which uses no printer driver having a function of making a judgment on the existence of the markup compatibility.

Although in Embodiments 1 and 2, printers 110, 210 are cited as examples of the image formation apparatus, the invention can be applied to MFPs, facsimiles and copying apparatuses as well, if they are apparatuses capable of processing the XPS data.

In addition, although the operation panel is cited in Embodiment 2 as an example of the method of setting the markup compatibility operational mode on printer 210, the settings can be made by use of a communication apparatus having software which enables the communication apparatus to execute communication with the printer.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An image formation apparatus comprising:
a data acquirer configured to acquire image formation data which includes image data and other data;
a data analyzer configured to
make a judgment whether or not the other data includes any one of an enable instruction to enable a compatibility securement function to secure compatibility of a version of the image formation data, and a disable instruction to disable the compatibility securement function,
if the judgment is that the other data includes the enable instruction, analyzing the image formation data in a compatibility securement enabled mode in which the compatibility securement function is enabled, and
if the judgment is that the other data includes the disable instruction, analyzing the image formation data in a compatibility securement disabled mode in which the compatibility securement function is disabled;
an image generator configured to generate an image from the image data on the basis of a result of the analysis by the data analyzer; and
an image formation unit configured to form an image on the basis of the image generated by the image generator,
wherein in the compatibility securement enabled mode, the data analyzer detects a description to secure the compatibility of the version of the image formation data from the image formation data, performs a process in accordance with the detected description, and then analyzes contents of the image formation data, and
wherein in the compatibility securement disabled mode, the data analyzer analyzes the contents of the image formation data without detecting the description to secure the compatibility of the version of the image formation data from the image formation data.

2. The image formation apparatus of claim 1, wherein
the enable instruction or the disable instruction is described in setting data included in the other data and specifies a setting needed to form the image, and
the data analyzer detects the enable instruction or the disable instruction from the setting data.

3. The image formation apparatus of claim 1, wherein the data analyzer changes contents of the image formation data into a format interpretable by the image generator by analyzing the image formation data.

4. The image formation apparatus of claim 1, wherein
the image formation data comprises compressed data including the image data and the other data, and
the data analyzer decompresses the image formation data, and judges whether or not the decompressed data includes any one of the enable instruction and the disable instruction.

5. An image formation apparatus comprising:
a data acquirer configured to acquire image formation data which includes image data and other data;
a data analyzer configured to
make a judgment whether or not the other data includes any one of an enable instruction to enable a compatibility securement function to secure compatibility of a version of the image formation data, and a disable instruction to disable the compatibility securement function,
if the judgment is that the other data includes the enable instruction, analyzing the image formation data in a compatibility securement enabled mode in which the compatibility securement function is enabled, and
if the judgment is that the other data includes the disable instruction, analyzing the image formation data in a compatibility securement disabled mode in which the compatibility securement function is disabled;
an image generator configured to generate an image from the image data on the basis of a result of the analysis by the data analyzer;
an image formation unit configured to form an image on the basis of the image generated by the image generator; and
a function setting storage unit configured to store function setting information specifying which of the compatibility securement enabled mode and the compatibility securement disabled mode is to be used to operate the data analyzer,
wherein if the image formation data includes no setting data, the data analyzer performs its processing in a mode specified by the function setting information.

6. The image formation apparatus of claim 5, wherein if the image formation data includes neither the enable instruction nor the disable instruction, the data analyzer performs its processing in a mode specified by the function setting information.

7. The image formation apparatus of claim 5, further comprising a setting unit configured to
receive an instruction specifying which of the compatibility securement enabled mode and the compatibility securement disabled mode is to be used to operate the data analyzer, and
generate the function setting information in accordance with the instruction.

8. An image formation apparatus comprising:
a data acquirer configured to acquire image formation data which includes image data and other data;
a data analyzer configured to
make a judgment whether or not the other data includes any one of an enable instruction to enable a compatibility securement function to secure compatibility of a version of the image formation data, and a disable instruction to disable the compatibility securement function,
if the judgment is that the other data includes the enable instruction, analyzing the image formation data in a compatibility securement enabled mode in which the compatibility securement function is enabled, and
if the judgment is that the other data includes the disable instruction, analyzing the image formation data in a compatibility securement disabled mode in which the compatibility securement function is disabled;

an image generator configured to generate an image from the image data on the basis of a result of the analysis by the data analyzer; and an image formation unit configured to form an image on the basis of the image generated by the image generator, wherein if the image formation data includes neither the enable instruction nor the disable instruction, the data analyzer performs processing in the compatibility securement enabled mode.

\* \* \* \* \*